(12) United States Patent
Shanley, IV et al.

(10) Patent No.: US 10,935,184 B2
(45) Date of Patent: Mar. 2, 2021

(54) COMPLIANT MOUNTING ARM

(71) Applicant: Magic Leap, Inc., Plantation, FL (US)

(72) Inventors: John Francis Shanley, IV, Emerald Hills, CA (US); William Andrew Lee, Palo Alto, CA (US); Masumune Kaji, Plantation, FL (US); Shigeru Natsume, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 113 days.

(21) Appl. No.: 15/651,363

(22) Filed: Jul. 17, 2017

(65) Prior Publication Data

US 2018/0017208 A1 Jan. 18, 2018

Related U.S. Application Data

(60) Provisional application No. 62/362,920, filed on Jul. 15, 2016.

(51) Int. Cl.
| | | |
|---|---|---|
| *F16M 13/04* | (2006.01) | |
| *F16M 13/00* | (2006.01) | |
| *G02B 27/01* | (2006.01) | |
| *G06T 11/60* | (2006.01) | |
| *H04N 5/247* | (2006.01) | |

(52) U.S. Cl.
CPC ............ *F16M 13/04* (2013.01); *F16M 13/00* (2013.01); *G02B 27/0176* (2013.01); *G06T 11/60* (2013.01); *H04N 5/247* (2013.01)

(58) Field of Classification Search
CPC ......... F16M 13/04; F16M 13/00; F16M 11/02
See application file for complete search history.

(56) References Cited

U.S. PATENT DOCUMENTS

| 2,966,913 A | * | 1/1961 | Lerner | A45D 2/14 |
| | | | | 132/253 |
| 5,003,300 A | * | 3/1991 | Wells | G02B 13/16 |
| | | | | 340/980 |
| 5,739,797 A | | 4/1998 | Karasawa et al. | |
| 6,480,174 B1 | * | 11/2002 | Kaufmann | G02B 27/0172 |
| | | | | 345/7 |
| 6,677,919 B2 | * | 1/2004 | Saito | G02B 27/0176 |
| | | | | 345/7 |

(Continued)

FOREIGN PATENT DOCUMENTS

WO 00/55672 9/2000

OTHER PUBLICATIONS

PCT International Search Report and Written Opinion for International Appln. No. PCT/US17/42425, Applicant Magic Leap, Inc., forms PCT/ISA/210, 220, and 237, dated Sep. 28, 2017 (8 pages).

(Continued)

*Primary Examiner* — Derek J Battisti
(74) *Attorney, Agent, or Firm* — Vista IP Law Group, LLP

(57) ABSTRACT

An improved headset is provided to selectively distribute the weight of the headset while securely registering the headset comfortably on a wearer's head. The headset comprises one or more compliant arms and a frame to selectively distribute the weight of the headset and secure the headset to the wearer's head without the need for straps or leavers. The compliant arms provide a normalizing force through elastic body deformation to selectively distribute the weight of the headset.

31 Claims, 15 Drawing Sheets

(56) References Cited

U.S. PATENT DOCUMENTS

| | | | |
|---|---|---|---|
| 7,740,353 B2 * | 6/2010 | Jannard | H04N 9/3173 351/158 |
| 8,593,795 B1 | 11/2013 | Chi | |
| 8,643,568 B2 * | 2/2014 | West | G02B 27/0176 345/8 |
| 8,994,610 B2 * | 3/2015 | Tricoukes | H04R 1/105 345/8 |
| 9,341,843 B2 * | 5/2016 | Border | G02B 27/0093 |
| 2005/0010992 A1 * | 1/2005 | Klotz | A41D 13/1153 2/171.3 |
| 2006/0057972 A1 * | 3/2006 | Wikel | A42B 3/30 455/90.3 |
| 2006/0132382 A1 * | 6/2006 | Jannard | G02C 11/06 345/8 |
| 2009/0168131 A1 * | 7/2009 | Yamaguchi | G02B 27/017 359/13 |
| 2013/0229614 A1 * | 9/2013 | Marini | G02C 5/16 351/114 |
| 2013/0285886 A1 | 10/2013 | Pombo et al. | |
| 2015/0309534 A1 * | 10/2015 | Osterhout | G06F 3/016 345/8 |
| 2015/0316773 A1 * | 11/2015 | Tazbaz | G02B 27/0179 359/630 |
| 2018/0017208 A1 | 1/2018 | Shanley, IV | |

OTHER PUBLICATIONS

Extended European Search Report for International Appln. No. PCT/US17/42425, Applicant Magic Leap, Inc., dated Jun. 27, 2019 (6 pages).

Response to Extended European Search Report for European Appln. No. 17828615.9 filed Jan. 24, 2020.

Foreign Exam Report for AU Patent Appln. No. 2017297619 dated Dec. 11, 2020.

Foreign OA for CN Patent Appln. No. 201780043773.X dated Nov. 2, 2020.

\* cited by examiner

COMPLIANT MOUNTING ARM

RELATED APPLICATION

The present application claims the benefit under 35 U.S.C. § 119 to U.S. provisional patent application Ser. No. 62/362,920 filed Jul. 15, 2016. The foregoing application is hereby incorporated by reference into the present application in its entirety.

FIELD OF INVENTION

The present application generally relates to headset designs for interactive virtual and augmented reality devices.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

VR or AR systems generally use headsets as the structure to mount components that provide a user with the visual and sometimes auditory portions of the VR/AR experience. These components may include, for example: one or more cameras to capture pictures and videos of the user's surrounding; one or more devices to project images and videos inward towards the user (e.g., lenses, video projectors, etc.); one or more sensors for sensing motion and direction; and one or more electronic computing devices to capture, render and display images and/or videos. While these additional components may be small and light weight individually, the combination of the components will add considerable additional weight to the headset. Even worse, the additional weight is usually towards the front of the headset and this additional weight is generally supported by the nose bridge of the wearer.

Extended or even short use of the headset can be uncomfortable on a wearer's nose bridge since the headset is heavy with all of the additional components affixed to the headset and coupled with the fact that most of the additional weight tend to be forward facing. Additionally, the headset must be securely attached to the wearer's head to operate effectively (e.g., for sensor positioning purposes, video captures, etc.)

Legacy headset designs typically employ one or more straps to securely attach the headset to the head of a wearer. The straps are generally adjustable and elastic. The adjustability of the straps allows for varying head sizes and shapes of different wearers. The elasticity of the straps secures the headset to a wearer's head and may also redirect some of the weight of the headset from a wearer's nose bridge to the wearer's head. However, the use of straps provides its own challenges: it is cumbersome to adjust, it is cumbersome to put on and take off the headset, the straps may need to be tightened in order to maintain a secure fit between the headset and a wearer's head, and finally, depending on the weight of the headset itself, the strap may need to be further tightened to ensure the headset does not provide too much weight to a wearer's nose bridge.

Therefore, there is a need for an improved headset that selectively redistributes the weight of the headset from the wearer's nose bridge to the wearer's head while securely registering the headset to the wearer's head.

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be inventions.

SUMMARY

Embodiments of the invention provide an improved apparatus to provide a retaining force to keep a headset secured comfortably on the wearer's head. The headset comprises one or more compliant mounting arms to allow for secure attachment of the headset to a wearer's head without the need for straps or levers. The compliant mounting arms provide a normalizing force to selectively distribute the load from the wearer's nose bridge to the forehead and other areas of the wearer's head. The compliant mounting arms may selectively distribute the load along the strongest structural portions of the skull. Comfort may be achieved by selective distribution of the load in various forms such as a uniform or near uniform distribution of the load (i.e. no point loads) and/or a non-uniform distribution of the load near and around certain points of the compliant mounting arm.

In one embodiment, a headset includes one or more compliant arms, and a frame, wherein the one or more compliant arms are coupled to the frame, and wherein the compliant arms selectively distribute a weight of the headset.

In one or more embodiments, the one or more compliant arms may uniformly distribute a weight of the headset. The one or more compliant arms may also non-uniformly distribute a weight of the headset. The one or more compliant arms may also be the same size and shape. The one or more compliant arms may also be adjustable on a multi-axis. The one or more compliant arms may also be adjustable along a variety of angles along a horizontal plane. The one or more compliant arms and the frame may be constructed as one single body, wherein the one or more compliant arms may be adjustable on a multi-axis.

In one or more embodiments, the headset may include two upper compliant arms, two compliant arms, and one frame, wherein the two upper compliant arms and the two compliant arms are adjustable on a multi-axis. The one or more complaint arms may be joined by a connector comprising a spool type spring. The one or more compliant arms may include an upward bend. The headset may be a virtual reality or augmented reality headset.

In another embodiment, a compliant arm may include an outer wall, an inner wall, a wall bridge, and a plurality of ribs connecting the outer wall, the inner wall, and the wall bridge, wherein the outer wall, the inner wall, the wall bridge and the plurality of ribs selectively distribute a load by an elastic body deformation.

In one or more embodiments, the compliant arm may be a single body. The compliant arm may be constructed from a same material. The same material may be a thermoplastic.

The compliant arm may be adjustable on a multi-axis when coupled to a frame. The compliant arm may be vertically adjustable when coupled to a frame. The compliant arm may be horizontally adjustable when coupled to a frame.

In one or more embodiments, the plurality of ribs may be of varying lengths. Each rib of the plurality of ribs may correspond to a different slenderness ratio. Each rib of the plurality of ribs may be a different thickness. A thickness of a rib from the plurality of ribs may be varying throughout the rib. One or more ribs from the plurality of ribs may have varying widths.

In one or more embodiments, the outer wall and the plurality of ribs may be constructed of different materials. The inner wall may be in compression, the outer wall may be in tension, the wall bridge may be in compression and tension, and each of the plurality of ribs may be in either tension or compression when a load is applied to the compliant arm. An arm width of the compliant arm may be a varying width at different points along the inner wall.

Each of the individual embodiments described and illustrated herein has discrete components and features that may be readily separated from or combined with the components and features of any of the other several embodiments.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The apparatuses disclosed herein address selectively distributing weight from a headset while securely attaching the headset to the wearer's head without the use of straps. This is achievable by affixing one or more compliant mounting arms onto the headset, wherein the headset comprises the components required to provide a wearer with a wearable computing headset, for example, to interact with the VR or AR experience.

There are many different bases on how to selectively adjust the distribution of a load. Therefore, there are many types of results that can be achieved by selectively distributing a load. For example, one result that can be achieved is a uniform or near uniform distribution of the load. By no means is the prior example the only type of result for selectively distributing a load. For example, another type of result may be dependent on the shape of a person's head. In this situation, it may be beneficial to distribute a load to certain point loads at certain locations along the compliant arm, which may achieve certain types of non-uniform loading results by simply pinpointing different points along the compliant mounting arm to distribute the load.

Figure 1A:
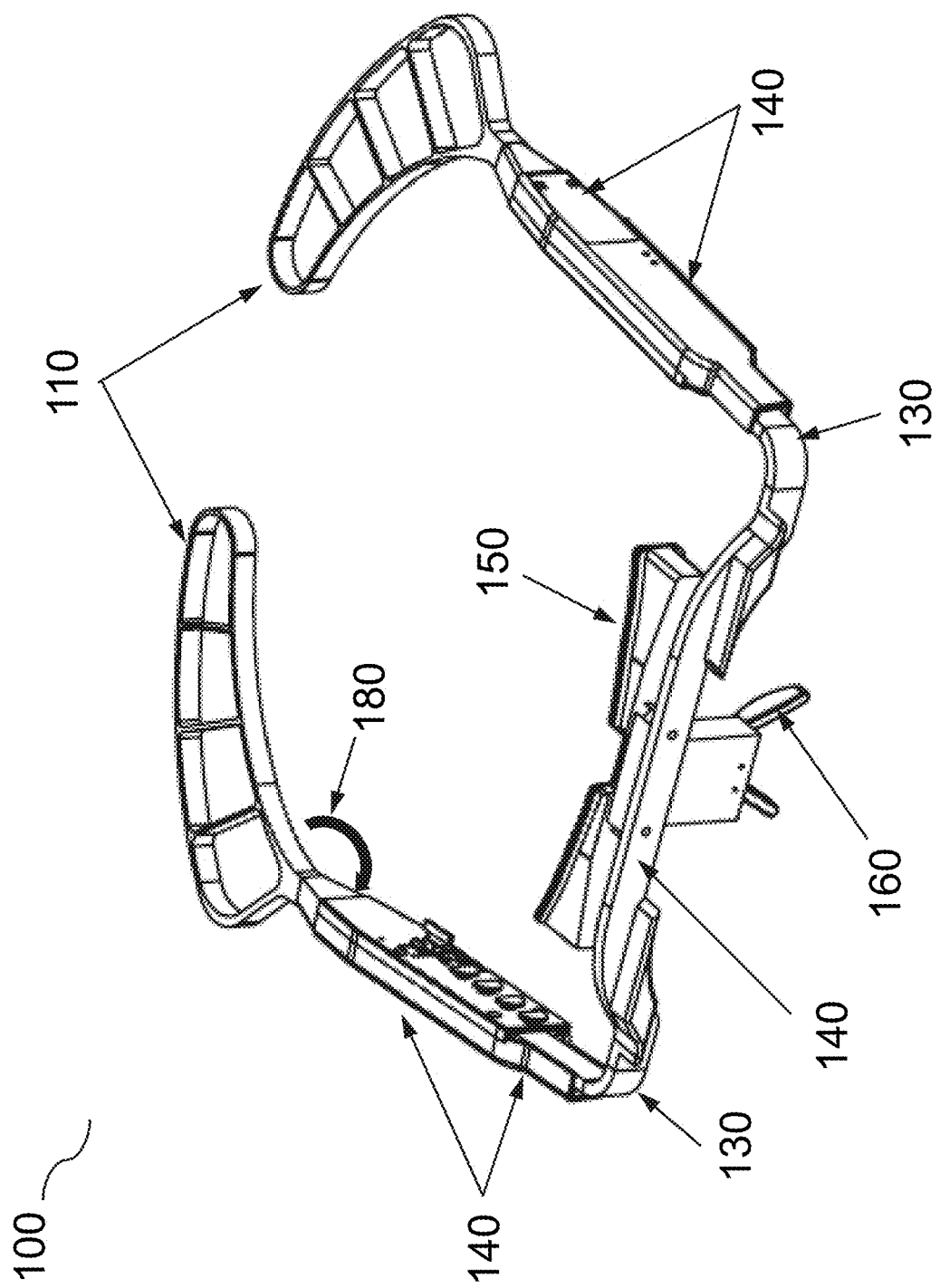
FIG. 1A illustrates a perspective view of an example headset for selectively distributing a load to a wearer's head while securely registering the headset to the head according to some embodiments of the invention.
Figure 1B:
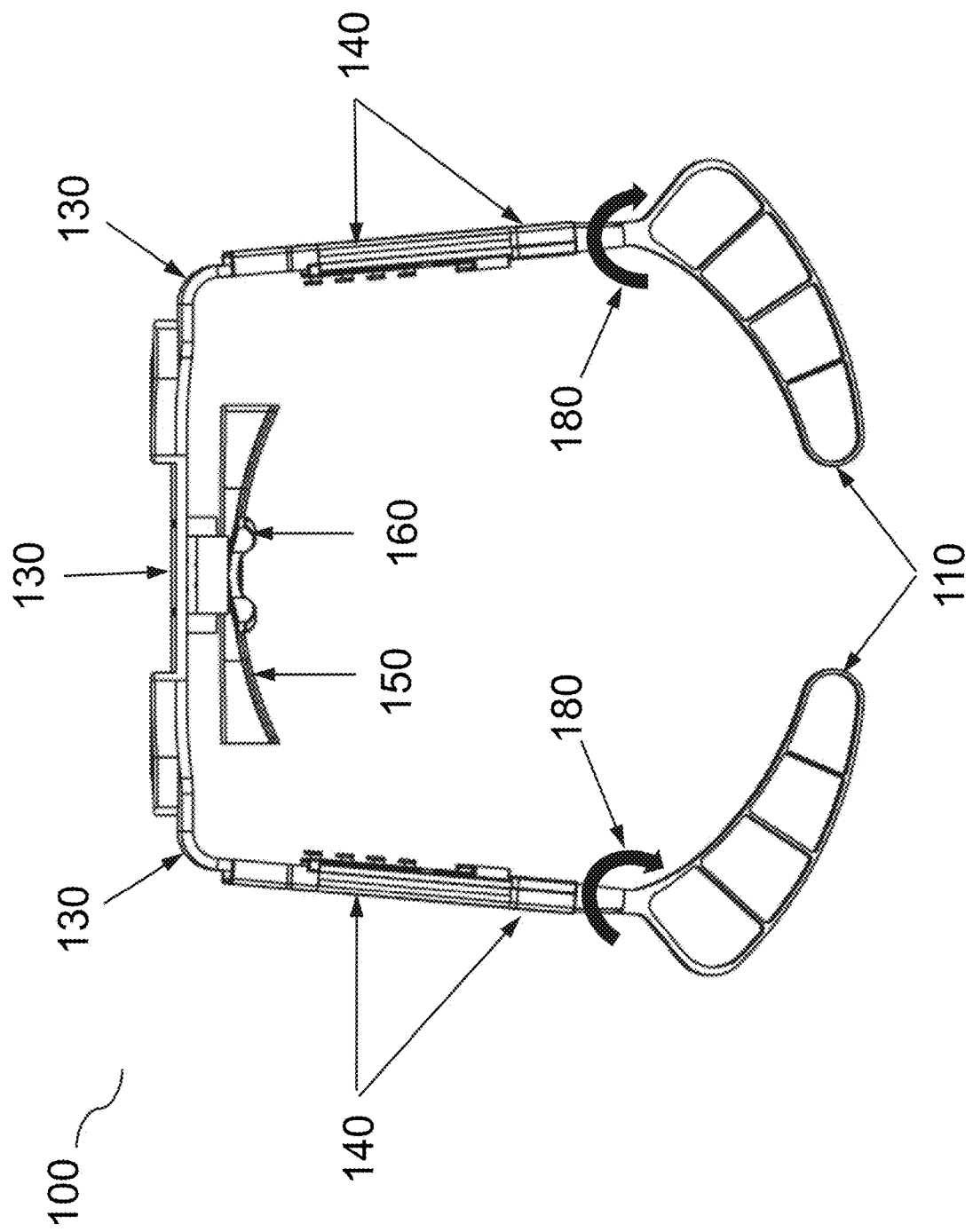
FIG. 1B illustrates a top view of an example headset for selectively distributing a load to a wearer's head while securely registering the headset to the head according to some embodiments of the invention.
Figure 1C:
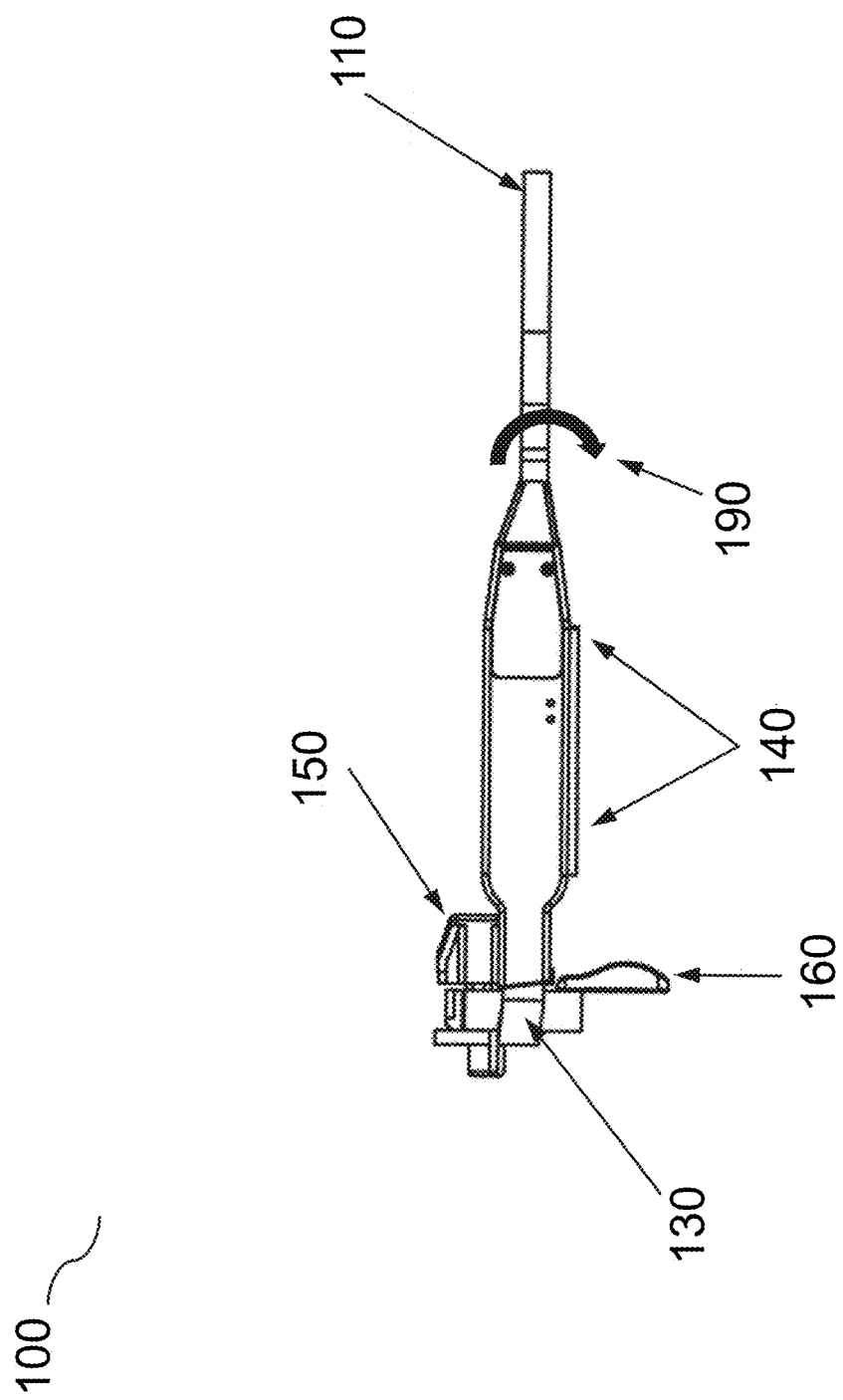
FIG. 1C illustrates a side view of an example headset for selectively distributing a load to a wearer's head while securely registering the headset to the head according to some embodiments of the invention.
Figure 1D:
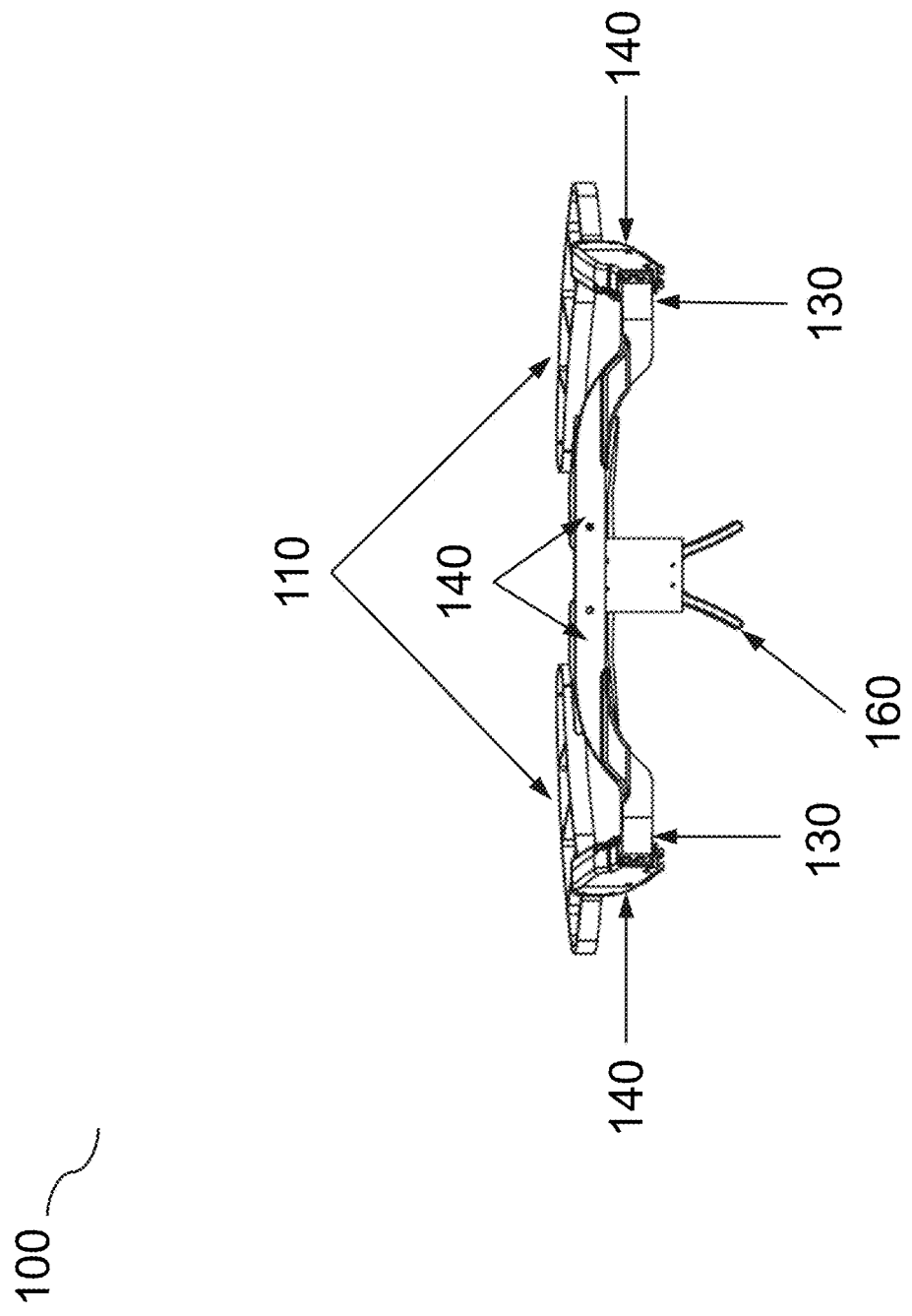
FIG. 1D illustrates a front view of an example headset for selectively distributing a load to a wearer's head while securely registering the headset to the head according to some embodiments of the invention.

FIGS. 1A-1D illustrates multiple views of an example headset for selectively distributing a load to a wearer's head while securely registering the headset to the head according to some embodiments of the invention. FIG. 1A illustrates a perspective view, FIG. 1B illustrates a top view, FIG. 1C a side view, and FIG. 1D illustrates a front view of the example headset for selectively distributing a load to a wearer's head while securely registering the headset to the wearer's head according to some embodiments of the invention.

Headset 100 is employed to selectively distribute a load onto a wearer's head, according to some embodiments. Headset 100 provides this ability to selectively distribute weight while still securely registering the headset and its components to the wearer's head.

Headset 100 comprises compliant arms 110, frame 140, forehead pad 150, and nose bridge 160. Compliant arms 110 are compliant mechanisms, wherein compliant arms 110 transfer an input force to another point through elastic body deformation. In some embodiments, compliant arms 110 may be the same size and shape. In some embodiments, compliant arms 110 may be varying size and shape between a left compliant arm and a right compliant arm, based at least in part on a deformation profile. In some embodiments, the compliant arms may be joined by a connector having a spool type spring, wherein the spool type spring provides a compression force for fitting adjustments for different head sizes instead of compression force for constricting the compliant arms and headset to a user's head. In such embodiments, the frame, compliant arms, and connector wrap around the user's head. As an example for this application, compliant arms 110 will be assumed to be the same shape and size for ease of explanation. However, one of ordinary skill in the art appreciates the compliant arms 110 may not be the same shape and size because of varying deformation profiles.

Frame 140 is a structure that holds certain components affixed to the frame 140 in front of a person's eyes. Frame 140 may comprise VR/AR components, for example sensors, cameras, electronic components, etc. Frame 140 also comprise forehead pad 150 and nose bridge 160. Frame 140 may include a temple that rests on the ears and allow the headset to transfer some of the weight of the headset onto the ears. Frame 140 may also have elastic features, for example, flexible points 130 to securely register the temple arms of frame 140 into the side of a wearer's head to provide some transfer of the weight of the headset 100 onto the side of a wearer's head. Flexible points 130 may be of a pre-formed flexible member designed to bend and unbend depending on an applied force, such as, for example, a pair of wrap-around sunglasses with no hinges between its temple arm and its eyeglass frame. In some embodiments (not shown in the figures), a compliant temple may be used to provide a uniform distribution of the weight of the headset along the side of a wearer's head, in addition to the compliant arms that may be used to provide a selective distribution of the weight of the headset towards anchor points/bones of the wearer's head.

In some embodiments of the invention (as depicted in FIGS. 1A-1D), there may be two or more compliant arms 110 coupled to one frame 140. For purposes of this discussion, for example, a headset 100 comprising two compliant arms 110 and one frame 140 will be further described.

In some embodiments, there may be only one forehead pad 150. In other embodiments (as shown in FIG. 1A-1B), there may be one or more forehead pads 150. Forehead pad 150 may take away some of the weight of headset 100 when there are reactive forces pulling the headset 100 towards the rear of the wearer's head, e.g., when the compliant arms 110 are creating a selectively distributed force on a wearer's head, the counter force may be on the forehead pad 150 to the wearer's forehead.

Compliant arms 110 may be adjustable on a multi-axis (e.g., vertical plane and/or horizontal plane) when coupled to the frame 140. For example, compliant arms 110 may be adjustable along a variety of adjustable angles 180 along a horizontal plane (a plane relative to how the arm is connected to the frame) to allow the compliant arms 110 to contact a wearer's head at a particular angle which may be suitable for most head sizes and shapes or which may be required due to a particular deformation profile, as shown in FIGS. 1A and 1B. The ability to adjust the lower compliant arms along adjustable angle 180 allows the wearer flexibility of setting an initial fit. The setting of the adjustable angle 180 for the initial fit may be by snapping the compliant arms 110 into place, spring-loaded detents, a screw in feature, other mechanism, or a secondary set of compliant mechanisms that adjusts the adjustable angle 180 of the compliant arms 110. The compliant arms 110 may also be displaced or distorted along the same horizontal plane once the headset 100 is applied onto a wearer's head. This displacement or distortion along the horizontal plane allows the compliant arm to selectively distribute a point load along its flexible structure to the wearer's head, which in turn create reactive forces against forehead pad 150 to redistribute weight from the headset from a wearer's nose bridge to other areas of the wearer's head.

In some embodiments, compliant arms 110 may be adjustable along another axis such as a horizontal axis such that the compliant arms 110 may be adjustable in a vertical plane about the horizontal axis. Compliant arms 110 may be adjustable along a variety of adjustable angle 190 along a vertical plane (a plane relative to how the arm is coupled to the frame) as shown in FIG. 1C. The ability to adjust compliant arms 110 along a variety of adjustable angle 190 may be important according to some embodiments. For example, the majority of the weight from headset 100 may need to be selectively distributed from the wearer's nose bridge and ears to the compliant arms 110 and forehead pad 150. In this situation, it may be beneficial to be able to adjust the compliant arms 110 by a variety of angles along adjustable angle 190 along the vertical plane to further allow compliant arms 110 to selectively distribute the weight from headset 100. One of ordinary skill in the art appreciates although the current example discloses a headset where most of the weight is towards the front of the headset, the same concept can be used to design compliant arms to selectively distribute a load wherever the load concentration may be on the headset, whether it is, for example, towards the front, the center, or the rear of the headset.

Figure 1E:
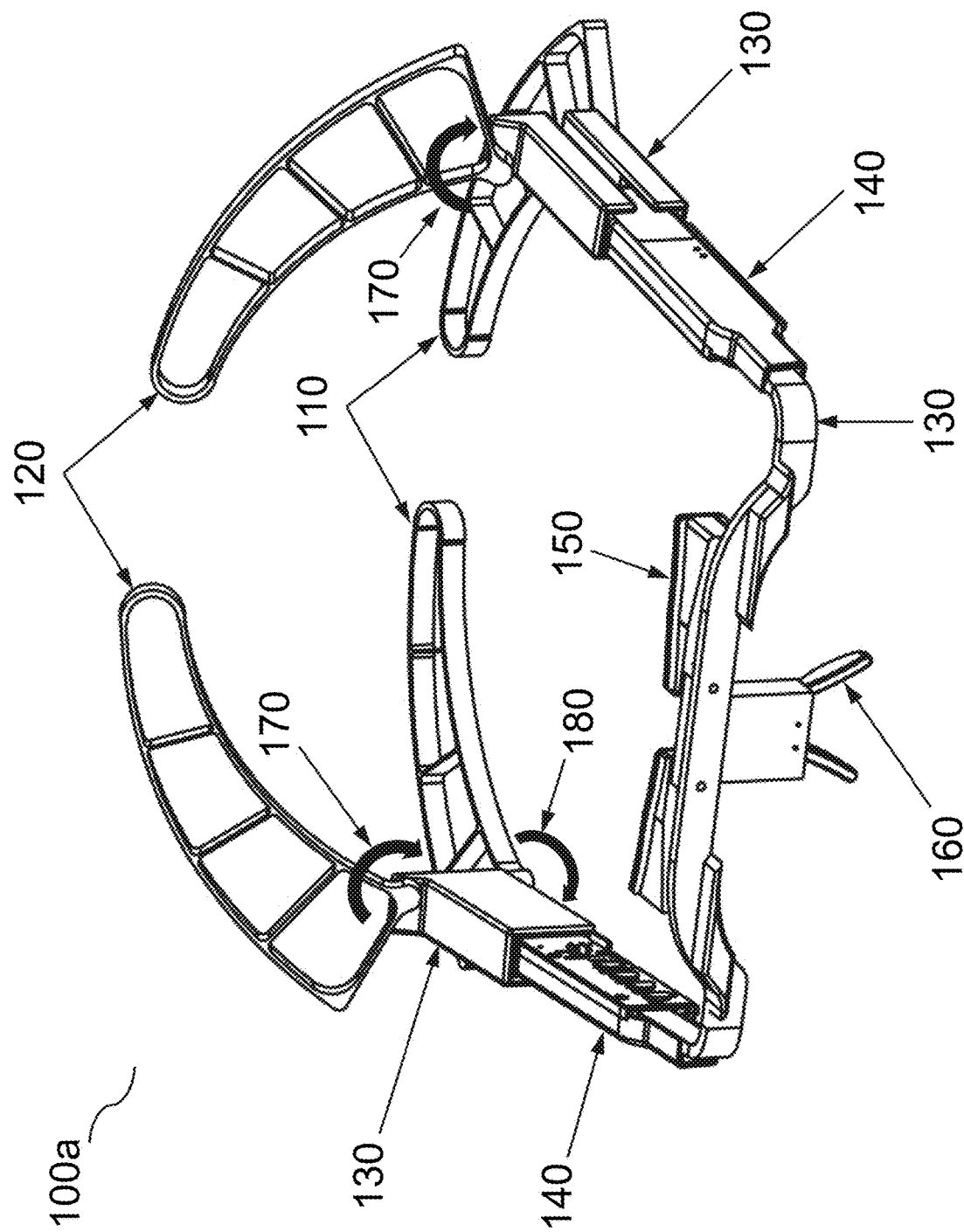
FIG. 1E illustrates a perspective view of an alternative example headset for selectively distributing a load to a wearer's head while securely registering the headset to the head according to some embodiments of the invention.
Figure 1F:
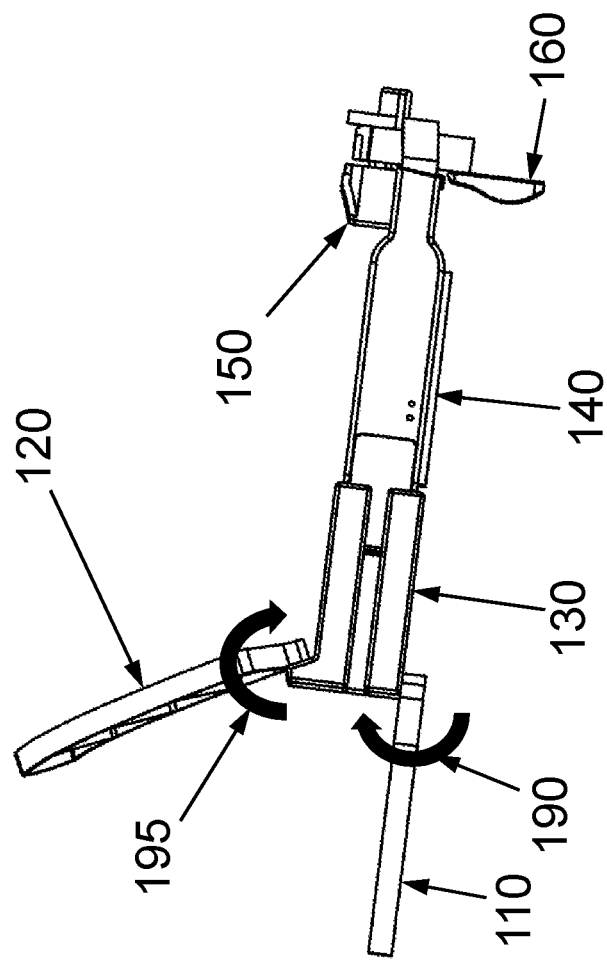
FIG. 1F illustrates a side view of an alternative example headset for selectively distributing a load to a wearer's head while securely registering the headset to the head according to some embodiments of the invention.

FIGS. 1E-1F illustrate a perspective and side view, respectively, of an alternative example headset for selectively distributing a load to a wearer's head while securely registering the headset to the head according to some embodiments of the invention.

As shown in FIGS. 1E-1F, headset 100a is a similar embodiment of headset 100 described in FIGS. 1A-1D. Headset 100a comprises upper compliant arms 120. Upper compliant arms 120 are compliant mechanisms such as compliant arms 110. Upper compliant arms 120 may provide additional selective distribution of the weight of the headset on a wearer's head. In some embodiments, headset 100a comprises one or more frame adapter 130.

Frame adapter 130 is an adapter that couples the compliant arms to the frame 140. In some embodiments, only the compliant arms 110 are coupled to a frame adapter 130. In other embodiments, both the compliant arms 110 and the upper compliant arms 120 are coupled to the frame adapter 130. In other embodiments, a compliant arm 110 and a plurality of upper compliant arms 120 are coupled to the frame adapter 130. Yet in other embodiments, the compliant arm(s) and the frame adapter 130 may be constructed as a single piece/body. In the event the upper compliant arms 120 and/or the compliant arm 110 is coupled to the frame adapter 130, the compliant arms may be coupled to the frame adapter using different types of attachments such as, for example, bolt-on arms, snap on arms, rotatable snap-fit arms, ratcheting features, and an extendible arm-mount or central component to disclose just a few. One of ordinary skill in the art appreciates there may be other types of attachments to couple a compliant arm to the frame adapter 130.

Frame adapter 130 may be rigidly attached onto the frame 140 using various techniques such as, for example, sliding or snapping the frame adapter 130 onto the temple arms of the frame 140. In some embodiments, frame adapter 130 having the compliant arm(s) and the frame 140 may be a single piece. In other embodiments, frame adapter 130 may be adjustable along the frame 140 to allow varying head sizes and shapes of different wearers. One of ordinary skill in the art appreciates there are many other ways to attach the frame adapter 130 to the frame 140.

Upper compliant arms 120 may be adjustable on a multi-axis (e.g., vertical plane and/or horizontal plane with respect to how the arm is coupled to the frame) when coupled to frame 140 or to frame adapter 130. Upper compliant arms 120 may be adjustable along a variety of adjustable angle 170 along a horizontal plane (e.g., a plane relative to how the arm is coupled to the frame) to allow the upper compliant arms to contact a wearer's head at a particular angle which may be suitable for most head sizes and shapes or which may be required due to a particular deformation profile. The ability to adjust the upper compliant arms along adjustable angle 170 allows the wearer flexibility of setting an initial fit. The setting of the adjustable angle 170 for the initial fit may be by snapping the upper compliant arms 120 into place, spring-loaded detents, a screw in feature, other mechanism, or a secondary set of compliant mechanisms that adjusts the adjustable angle 170 of the upper compliant arms 120. The compliant arms may also be displaced or distorted along the same vertical plane as adjustable angle 170 once the headset 100a is applied onto a wearer's head. In some embodiments, it is this displacement or distortion of force or weight along adjustable angle 170 that allows the compliant arm to selectively distribute a point load along its flexible structure to the wearer's head.

In some embodiments, upper compliant arms 120 may be adjustable on a multi-axis (e.g., vertical plane and/or horizontal plane with respect to how the arm is coupled to the frame) when coupled to frame 140 or frame adapter 130. For example, upper compliant arms 120 may be adjustable along adjustable angle 195 along a vertical plane as shown in FIG. 1F. The ability to adjust upper compliant arms 120 along adjustable angle 195 may be important if frame adapter 130 is adjustable forward or backward with respect to the frame 140 in order to maintain a particular angle of contact between the upper compliant arm 120 and the wearer's head to avoid having certain edges of the upper compliant arms 120 in direct contact with the wearer's head. Furthermore, the ability to adjust the upper compliant arms 120 along adjustable angle 195 may also help improve the uniformity of the distribution of weight from the upper compliant arms 120 to the wearer's head.

Headset 100a in FIGS. 1E-1F contains two variations from headset 100 shown in FIGS. 1A-1D. The two variations are frame adapter 130 and upper compliant arms 120. The two additional variants (e.g., frame adapter 130 and upper compliant arms 120) are independent variations of headset 100. Headset 100 may operate independently of and do not need to have frame adapter 130 and/or upper compliant arms 120. Headset 100a describes alternative examples of how a headset 100 may be configured.

Compliant mechanisms are flexible mechanisms that transfer an input force or displacement to another point through elastic body. Compliant mechanisms can be designed to transfer an input force selectively across predetermined portions of its elastic body through deformation. Compliant mechanisms are elastic. Compliant mechanisms gain at least some of their mobility from the deflection of flexible members rather than from movable joints. Since compliant mechanisms rely on the deflection of flexible members, energy is stored in the form of strain energy in the flexible members. This stored energy is similar to the potential energy in a deflected spring, and the effects of springs may be integrated into a compliant mechanisms design to distribute an applied load. This can be used to easily store and/or transform energy to be released at a later time or in a different manner. A bow and arrow system is a simple example of this. Energy is stored in the limbs as the archer draws the bow. This potential energy is then transformed to kinetic energy of the arrow. These energy storage characteristics may also be used to design for specific force-deflection properties, or to cause a mechanism to tend to particular positions.

Compliant mechanisms are designed specifically to transfer an input force or displacement at one point of the mechanism to another point through elastic body deformation. A compliant mechanism may be designed based on a deformation profile and a slenderness ratio.

A deformation profile is the geometry obtained by an object after a prescribed loading is applied. For some embodiments, a deformation profile may be one that matches as closely as possible to the profile or geometry or contour of a wearer's head. Additionally, a point load applied to a fixed position of a compliant mechanism may be designed to non-uniformly or uniformly/near-uniformly distribute the load across the compliant mechanism through elastic body deformation based at least in part on a deformation profile. For example, the deformation profile of a compliant mounting arm may be designed to deform the compliant arm along the contour of a wearer's head while selectively distributing a normalizing load of the point load across the arm and onto the wearer's head.

In some embodiments (non-uniform distribution), the deformation of the compliant arm may distribute point loads of the load to particular pinpoint locations on the compliant arm to non-uniformly distribute the load as a point load to an anchor point/bone on a wearer's head. The anchor point/bone may be a strong bone structure that can withstand a load without discomfort, for example, the occipital bone, temporal bone, mastoid/styloid process, and ridge along the parietal bone.

In some embodiments, the deformation of the compliant arm (uniform/near-uniform distribution) may wrap around a wearer's head to uniformly/near-uniformly distribute the normalizing force onto the wearer's head. For a compliant mechanism, the design of the compliant mechanism may allow the transformation of the single point load via elastic body deformation of the entire compliant mechanism. This may be desired so that a single point load is not just transferred as another single point load, but instead, distributed as uniformly as possible across multiple points of the compliant mechanism body.

One of ordinary skill in the art appreciates a compliant mechanism can be designed to either uniformly or non-uniformly distribute a load. In some embodiments, a compliant mechanism may be designed to achieve both types of load distribution results, wherein certain portions of the compliant arm may be designed to uniformly distribute a portion of the load while other portions of the compliant arm may be designed to non-uniformly distribute a portion of the load to an anchor point/bone.

An embodiment of a compliant arm will be discussed vis-à-vis FIGS. 2A-2D.

Figure 2A:
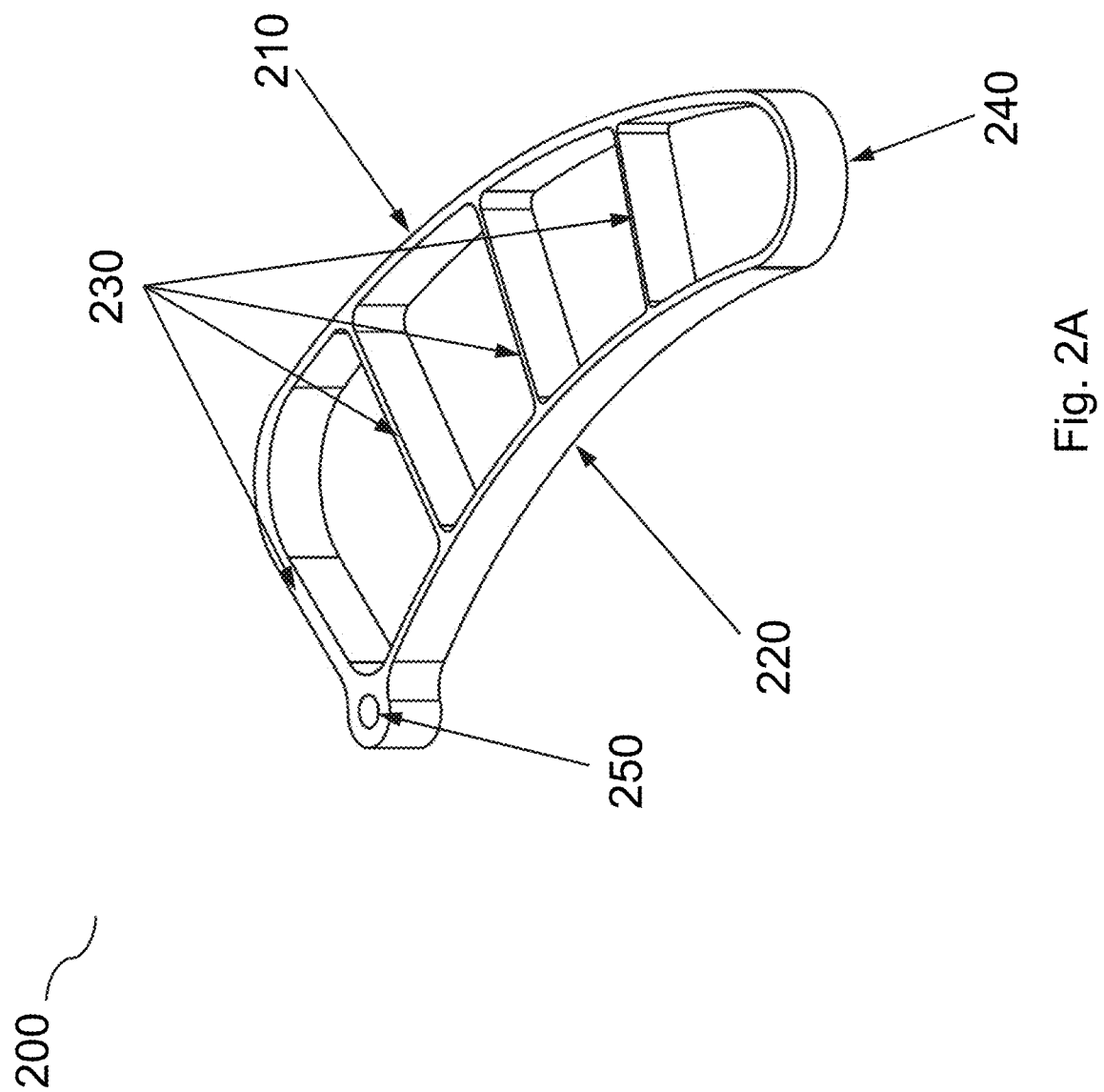
FIG. 2A illustrates a perspective view of an example of a compliant arm according to some embodiments of the invention.
Figure 2B:
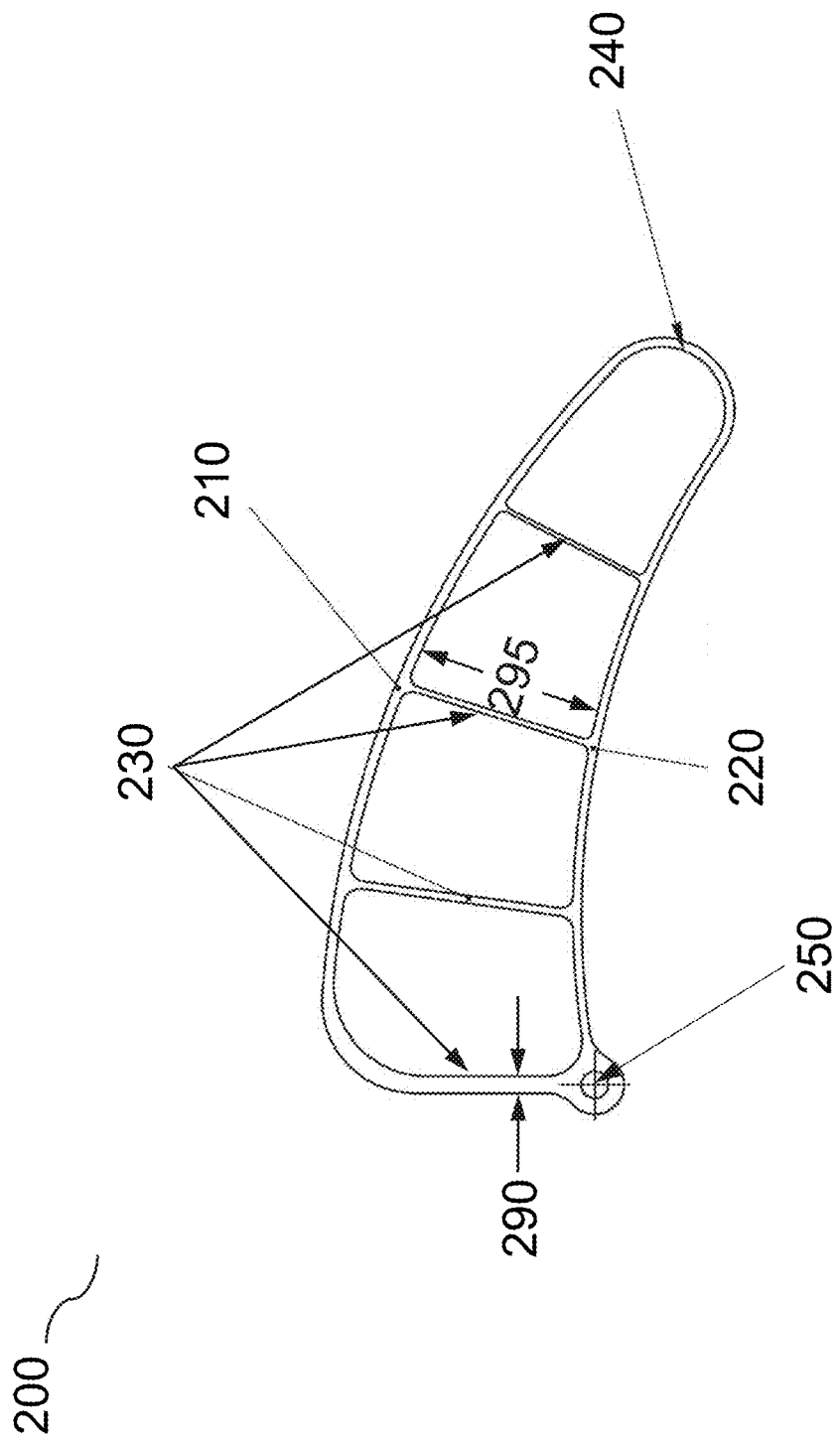
FIG. 2B illustrates a top view of an example of a compliant arm according to some embodiments of the invention.
Figure 2C:
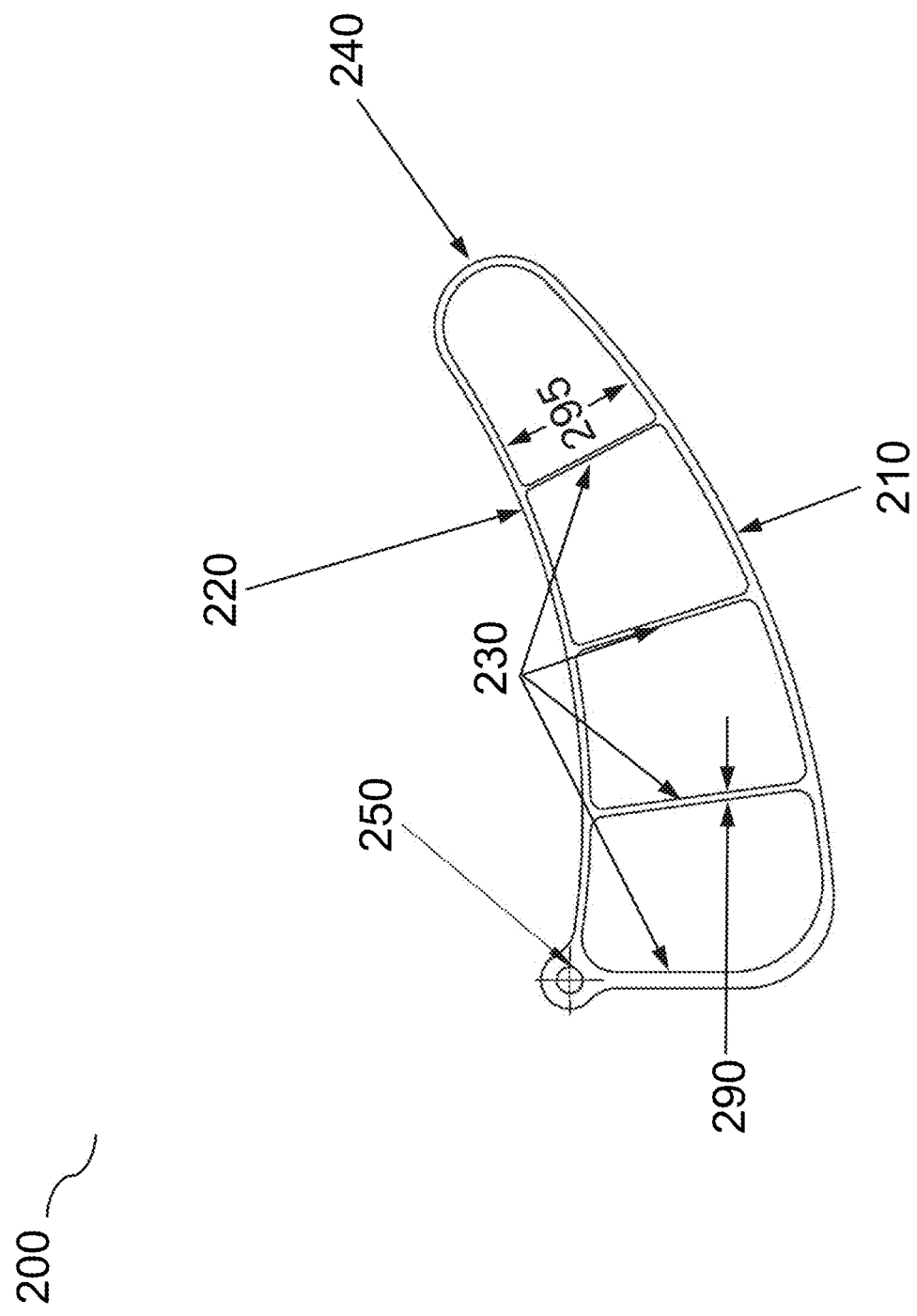
FIG. 2C illustrates a bottom view of an example of a compliant arm according to some embodiments of the invention.
Figure 2D:
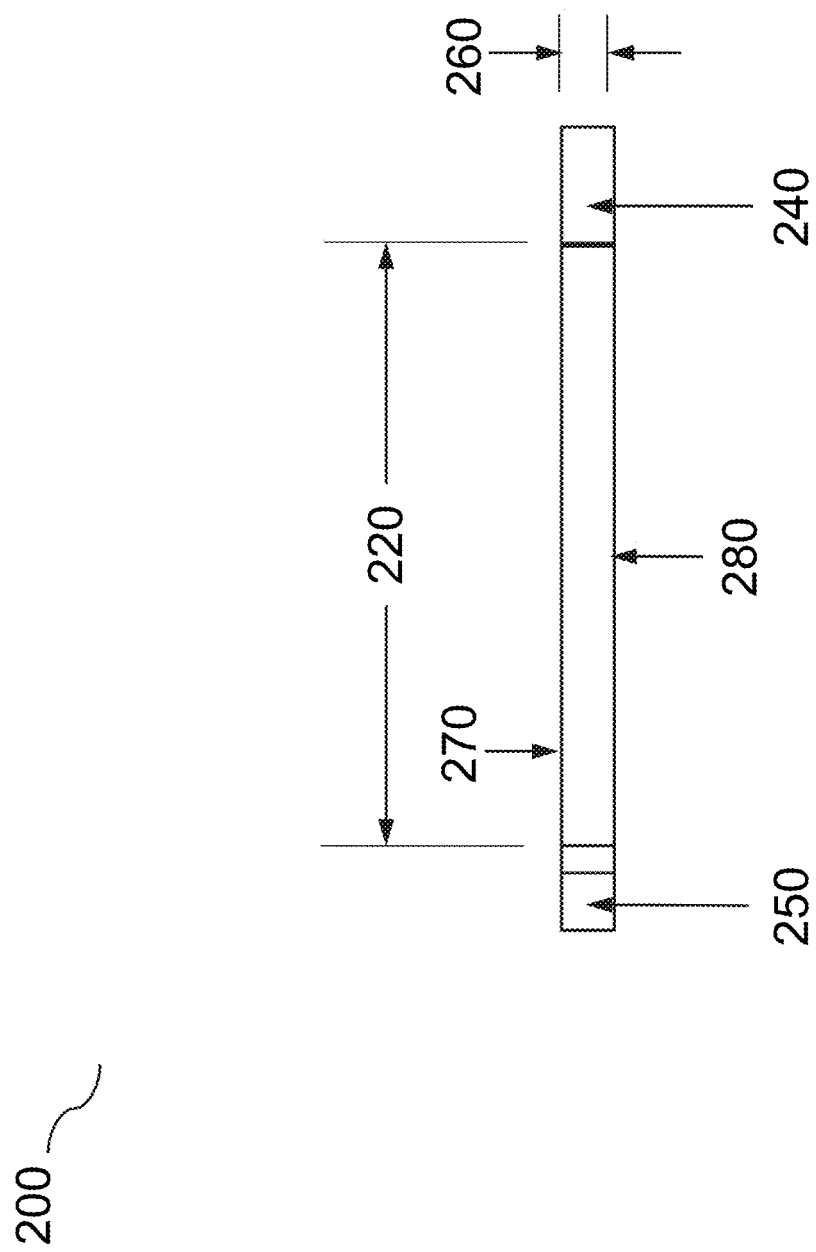
FIG. 2D illustrates a side view of an example of a compliant arm according to some embodiments of the invention.

FIGS. 2A-2D illustrates multiple views of an example of a compliant arm according to some embodiments of the invention. FIG. 2A illustrates a perspective view, FIG. 2B illustrates a top view, FIG. 2C illustrates a bottom view, and FIG. 2D illustrates a side view on a compliant arm.

Compliant arm 200 is a compliant mechanism designed to selectively distribute a point load to other points of the compliant arm 200 through elastic body deformation. As discussed in FIGS. 1A-1D, compliant arm 200 may be a compliant arm 110.

Outer wall 210 is the outer wall of the compliant arm 200 that does not come in direct contact with the wearer's head. The outer wall 210 is a flexible member with structural strength. Outer wall 210 may be in compression or tension, depending on the force that is introduced to the compliant arm 200. Inner wall 220 is the portion of compliant arm 200 that comes in direct contact with the wearer's head. Inner wall 220 is a flexible member with some structural strength. Inner wall 220 may be in compression or tension, depending on the force that is introduced to the compliant arm 200.

In some embodiments, rib 230 is flexible member with structural rigidity. In some embodiments, rib 230 is anchored to outer wall 210 and inner wall 220 at either end of rib 230. As a load is applied to a compliant arm 200 with flexible rib 230, the flexible rib 230 deforms according to its particular slenderness ratio and modulus, thereby distributing amount of the load incident to a given rib 230 location in compliant arm 200.

In some embodiments, rib 230 is rigid and does not deform under application of loads to compliant arm 200, that is, inner wall 220 and outer wall 220 deform but rib 230 does not deform and instead shifts its orientation by solid body rotation in response to an applied load. In such embodiments, rib 230 adjusts orientation between outer wall 210 and inner wall 220 through hinges (not depicted) coupling either end of rib 230 to outer wall 210 and inner wall 220. Loads are thus distributed along compliant arm 200 in the direction and in proportion to the vector orientation of a rigid rib 230 under such solid body rotation.

A compliant arm 200 may have one or more rib 230 to achieve a desired deformation profile. Rib thickness 290 is the thickness of a particular rib 230. Rib length 295 is the length of a particular rib 230. Rib 230 may be of varying length and/or thickness depending on a desired slenderness ratio.

A slenderness ratio is the ratio of the length of a column and the least radius of gyration of its cross section. It is used extensively for finding out the design load as well as in classifying various columns in short/intermediate/long. In some embodiments, each rib may have its own slenderness ratio to produce a non-uniform distribution of a load. In some embodiments, there may be a constant slenderness ratio applied to a plurality of the ribs to produce a more uniformly/near-uniformly distribution of a load. Therefore, the slenderness ratio is a quantifiable metric for the relative amount of flex to rib 230 given an input load to the compliant arm 200.

The longer the rib, the more flexibility it will have over a similar shorter rib. In some embodiments, a rib may have varying thickness 290 throughout its length 295 to achieve a desired deformation profile. For example, the base of a rib 230 (the connection to the inner wall) may have a thickness greater or less than the top of the rib 230 (the connection to the outer wall). In some embodiments, the base of a rib 230 and the top of the rib 230 may have a greater rib thickness 290 than rest of the length of the rib to avoid stress concentration where the ribs meet the walls. In such an embodiment, this is desired because the ribs are meant to flex such that they create a relative deformation between the inner wall 220 and the outer wall 210. Rib 230 may also be variably spaced between another rib 230 depending on the targeted deformation profile to achieve as much of a uniform distribution of load along the inner wall 220 and a wearer's head. During application of a load on the compliant arm 200, one or more of the rib 230 may be in compression or in tension. In some embodiments one or more rib 230 may be in compression while one or more other rib 230 within the same compliant arm 200 may be in tension. The one or more rib 230 may be perpendicularly connected to inner wall 220 to maintain a contour line to match of a wearer's head. The length of a rib 230, the spacing between the ribs, and the rib thickness 290 of a rib 230 are variables that can be modified to achieve a desired deformation profile to selectively distribute a load.

Wall bridge 240 is the last rib most opposite from mounting hole 250. In some embodiments, wall bridge 240 may be more rigid than ribs 230 to provide added strength incident to an anchor point/bone on a wearer's head. The anchor point being strong bones, for example, the occipital bone, temporal bone, mastoid/styloid process, and ridge along the parietal bone. Higher relative rigidity of wall bridge 240 ensures outer wall 210 and inner wall 220 have complementary tension and compression at a given point when subject to an input force. Mounting hole 250 is an arbitrary mounting hole to attach the compliant arm 200 to a frame (see FIGS. 1A-1D).

In some embodiments a mounting hole 250 may not exist, such as, for example, when the compliant arm 200 and the frame 140 may be a single piece. In other embodiments, the mounting hole 250 may not be a mounting hole, but instead an alternate mounting structure such as, for example, a ball and socket, a snap on attachment, etc. In some embodiments, mounting hole 250 may not be a mounting hole altogether, but a mounting structure instead. For example, a mounting structure may be a ball and socket structure, where mounting hole 250 may be a ball in a ball and socket attachment structure.

Thus, mounting hole 250 is an arbitrary mounting hole for the purpose of explanation of the compliant arm 200.

In some embodiments, the first rib 230, the rib that is directly above the mounting hole 250 per FIG. 2B, may be the thickest, longest and least flexible of all of the ribs in a compliant arm 200. This first rib 230 provides varying counteracting force against the rest of the compliant arm 200 structure. If the first rib 230 is thin and very flexible and there is an upward force applied to the wall bridge, the entire compliant arm 200 may rotate over the point of the mounting hole 250 and the first rib will be completely compressed and thus creating a potential rotation of the compliant arm 200 over the mounting hole and deform the structure such that the compliant arm 200 does not deform to the contours of a wearer's head. However, if the first rib is somewhat rigid, then the entire arm would not rotate over the mounting hole, but instead, create a counter force on the rest of the compliant arm 200 to redistribute the load across the compliant arm structure to deform the other components such as, for example, the other ribs, outer wall, inner wall and the wall bridge to achieve a desired deformation profile of wrapping the compliant arm 200 around the contours of the wearer's head while distributing a counter acting force against a single point load across the inner wall and evenly onto the wearer's head.

In some embodiments, a constant slenderness ratio for each of ribs 230 may maintain a relatively uniform force across compliant arm 200 through the controlled buckling/bending of the ribs to drive the relative motion of the inner wall 220 and outer wall 210. For example, even though the ribs may have varying lengths and thicknesses, they may be designed to support a uniform distribution of load. In other embodiments, with a varying slenderness ratio at any one rib, the distribution of force may be non-uniform. For example, if an early rib has a higher slenderness ratio than a later rib (an early rib being a rib closer to the front of the headset 100 and a later rib being a rib closer to the rear of headset 100) then the early rib would deform more than the later rib with a lower slenderness ratio and therefore would distribute more force, as an example, on the end towards the wall bridge 240. Furthermore, the wall bridge 240 may apply the non-uniformly distributed load as a point load to an anchor point/bone on a wearer's head, in which case, may be more advantageous than applying a uniformly distributed load along the head of a wearer that is not an anchor point/bone. Therefore, in some embodiments, varying the slenderness ratio relative to adjacent ribs could provide greater comfort than using a common slenderness ratio across a plurality of ribs to produce a uniformly distribution of the load as an applied force could be distributed to desired points on a user's anatomy. For example, if an early rib towards the front of a compliant arm had a higher slenderness ratio and each successive rib toward the back of the compliant arm had a decreasing slenderness ratio relative to the previous rib, an applied load would be more localized toward the back of the compliant arm. One of skill in the art will appreciate many alternative configurations of arranging ribs with various slenderness ratios, such as high slenderness ratios in the central ribs with relatively lower slenderness ratios in the early and later ribs to distribute an applied load towards either end of a compliant arm (for example in a headset use such distribution would direct the load towards the temple or occipital bone respectively).

FIG. 2D illustrates a side view of compliant arm 200 according to some embodiments of the invention. Arm width 260 is the width of the compliant arm 200. In some embodiments, arm width 260 may be uniform in width as shown on FIG. 2D. In other embodiments, arm width 260 may be of varying width at various points along the inner wall 220 and/or outer wall 210 to address various deformation profiles or different shaped compliant arms. In such embodiments, the width of rib 230 may be of varying width to correspond to the varying width of the inner wall 220 and/or the outer wall 210. In other embodiments, the width of rib 230 may be of varying width along the length of rib 230. The variations of width sizes on the various components within a compliant arm 200 may be factors considered when designing a compliant arm for a particular deformation profile, wherein the variations of width sizes of ribs 230 may be variables to consider in determining a slenderness ratio.

In some embodiments where an upper compliant arm 120 (See FIGS. 1E-1F) is utilized, upper edge 270 is the edge of the compliant arm 200 closest to the front portion of a wearer's head. For a compliant arm 110, upper edge 270 is the edge of the compliant arm 200 that is towards the top of the head. For the upper compliant arm 120, lower edge 280 is the edge of the compliant arm 200 furthest from the front portion a person's head, e.g., towards the backside of the head. For the compliant arm 110, lower edge 280 is the edge of the compliant arm 200 that is towards the bottom of the head.

The interaction between the outer wall 210, inner wall 220, rib(s) 230, and wall bridge 240 based on an input force will produce redistribution of the input force throughout the compliant arm 200 structure. The redistribution of the input force transferred on the compliant arm and how it is selectively distributed to the wearer's head is dependent on at least the deformation profile and slenderness ratios. Furthermore, based on the deformation profile and slenderness ratios, the materials of the components within compliant arm 200 may vary. In some embodiments all of the components within compliant arm 200 are made from the same material, for example, thermosets, thermoplastics, metals and composites. In some embodiments, the components within compliant arm 200 may be constructed from different materials, for example thermosets, thermoplastics, metals and composites, just to name a few. In some embodiments, the material of the outer wall 210 may be constructed from, for example, a very elastic plastic material while the material of the wall bridge 240 may be constructed from a flexible metal while the rib(s) 230 may be constructed from yet another plastic material with less flexibility than the outer wall 210, but more flexibility than the wall bridge 240 with the inner wall 220 made from a composite.

In some embodiments, one or more rib 230 may have varying length within the same compliant arm 200 to achieve a particular deformation profile to selectively distribute the load. Furthermore, the spacing between each rib 230 may also be varied to achieve a desired deformation profile to selectively distribute the load. The rib thickness 290 may also be a factor to achieve a desired deformation profile to selectively distribute the load. Additionally, the rib width may also be a factor to achieve a desired deformation profile. Similar to the other components within compliant arm 200, rib 230 may be constructed from various materials depending on the desired deformation profile to selectively distribute the load. One of ordinary skill in the arts appreciates the shape and sizes of a compliant arm 200 may vary depending on the material of the compliant arm 200, rib length 295, rib thickness 290, rib width, spacing of the rib 230, number of ribs 230, material and thickness of inner wall 220 and outer wall 210, arm width 260 of the outer wall 210 and inner wall 220, and/or stiffness of wall bridge 240, just to name a few.

The compliant mounting arm is a passive compliant mechanism having one or more compliant arms to selectively redistribute the weight of the headset based at least in part on a deformation profile and slenderness ratio. A passive mechanism is a mechanism that is not deliberately actuating the system. Therefore, the compliant mechanism is actuated (elastic body deformation) by the forces resulting when a person places a headset with the compliant arms on his/her head.

Figure 3:
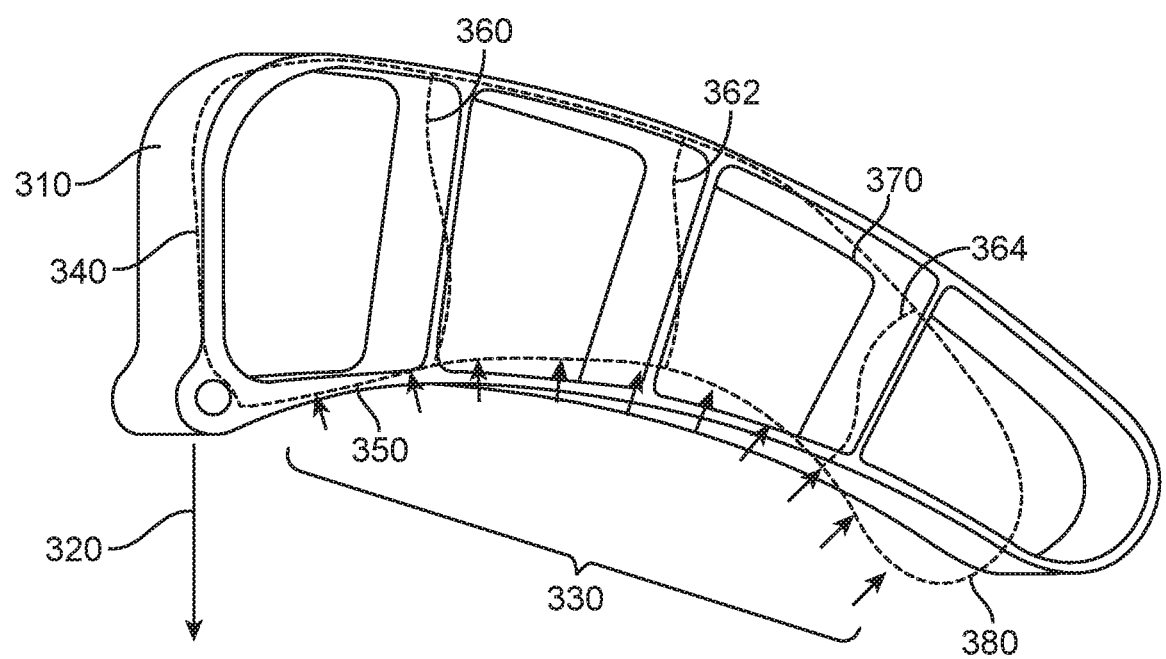
FIG. 3 illustrates an example of how a compliant arm deforms and selectively distribute a load according to some embodiments of the invention.

FIG. 3 illustrates an example of how a compliant arm deforms and uniformly distributes loads according to some embodiments of the invention. A resting state of a compliant arm 200 is depicted as compliant arm 310. Compliant arm 310 may be one arm of an upper compliant arm 120 or a compliant arm 110. For purpose of this example, compliant arm 310 is an upper compliant arm 120 (from FIGS. 1E-1F). In one embodiment, a deformed state of the compliant arm 310 in response to a point load 320 (e.g., from the weight of the headset) is depicted as dotted lines to illustrate a sample elastic body deformation as a result of a point load 320. Each of the components of the deformed state of the compliant arm 310 is further disclosed and described as reference numbers 340 and greater. Point load 320 may be generated as a result of the weight of a headset, for example, a frame 140 loaded with VR/AR components. Reactive forces 330 are the uniformly distributed forces generated as a result of the elastic body deformation of the compliant arm 310. The smaller arrows depicting reactive forces 330 are similar in length to illustrate the uniformity/near-uniformity of the load of the inner wall 350 against the wearer's head. In this particular example, inner wall 350 is in compression, outer wall 370 is in tension, rib 360, 362, and 364 are in compression as shown by the buckling shape of the ribs. First rib 340 is in tension because it is still straight and in almost direct opposite direction as the point load 320. Wall bridge 380 is in both compression and tension as it is deforming and wrapping around wearer's head. One of ordinary skill in the art appreciates the varying degree of elastic deformation in relations to a uniform distribution of force along the compliant arm 310 may vary by using different materials, having varying length ribs, having varying spacing of the ribs, having varying thickness of the ribs, having varying widths of the ribs, upper wall, lower wall, and wall bridge. One of ordinary skill in the art appreciates compliant arm 310 may be designed to selectively distribute the weight through elastic body deformation by selectively distributing load 320 towards wall bridge 380 to apply a non-uniformly distributed load to an anchor point/bone (not shown in FIG. 3).

In some embodiments, compliant arm 310 may comprise 4 ribs, as shown in FIGS. 2A-2C. In other embodiments, compliant arm 310 may comprise two or more ribs. The number of ribs in a compliant arm 310 is dependent upon a desired deformation profile. More ribs may allow a more evenly distributed force along the compliant arm; whereas fewer ribs may allow for more selective localization of force along the compliant arm. However, the number of ribs may also be dependent on a length of the outer wall and inner wall as well.

Figure 4:
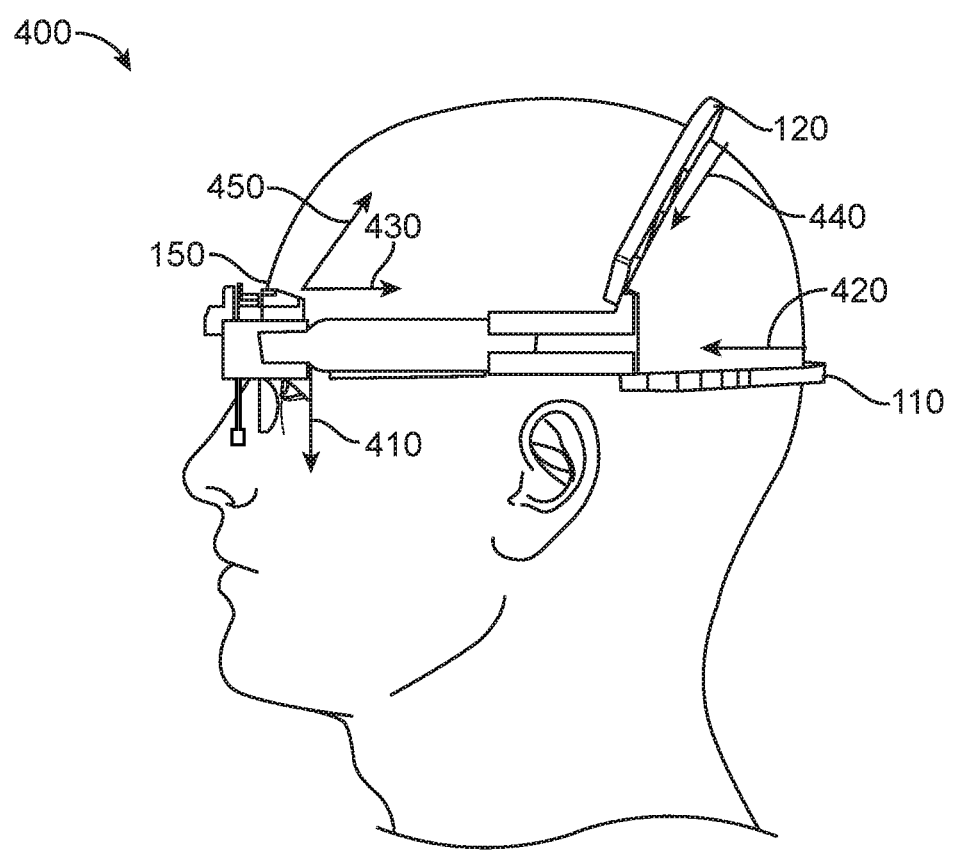
FIG. 4 illustrates an example of how the weight of a headset on a wearer's head may be redistributed by using a compliant mounting arm according to some embodiments of the invention.

FIG. 4 illustrates an example of how the weight of a headset on a wearer's head may be selectively distributed by using a compliant mounting arm according to some embodiments of the invention. The arrows in FIG. 4 illustrate the general direction of the weight of the headset 400 and the direction of the force distribution using the compliant mounting arms according to some embodiments. In some embodiments, the majority of the weight 410 of the headset is located towards the front of the headset because of the additional components required as discussed above to provide the wearer of the headset a virtual reality/AR experience.

The weight 410 has a downward force placing most of the weight of the headset onto the nose bridge of a wearer. The weight 410 of the headset is heavy because of the weight of the additional VR/AR components (not shown in FIG. 4). However, countering forces created by the compliant arms offset much of the force from the nose bridge of the wearer to other areas on the wearer's head, for example, the forehead and anchor points/bones on the head, for example, occipital bone, temporal bone, mastoid/styloid process, and the ridge along the parietal bone.

Active force 420 is generated from compliant arms 110. Compliant arms 110 are deformed into the Parietal or Occipital bones of the wearer's head because of the downward force generated by the weight 410. The deformation of compliant arms 110 generate an active force 420, which in turn produces reactive force 430 and reactive force 450 against the forehead pad 150. Reactive force 430 and reactive force 450 also secure the headset to the wearer's forehead and reduce the weight 410 from the headset onto the wearer's nose bridge.

In some embodiments, headset 400 may comprise upper compliant arms 120. Upper compliant arms 120 are compliant arms that are more vertically aligned with the frame 140. Although compliant arms 110 and forehead pad 150 may selectively distribute the majority of the weight 410, some embodiments of the invention may include upper compliant arms 120 for further selective distribution of load. Active force 440 is generated from upper compliant arms 120. Upper compliant arms 120 are deformed into the Parietal bone of the wearer's head because of the downward force generated by the weight 410. The deformation of upper compliant arms 120 generate an active force 440, which in turn produces reactive force 450 and reactive force 430 against the forehead pad 150. Reactive force 450 is not dependent on the presence of upper compliant arms 120. In some embodiments, reactive force 450 may be produced by having only compliant arms 110 without upper compliant arms 120. This is possible by active force 420 and reactive force 430 coupled with weight 410.

Reactive force 450 may also secure the headset to the wearer's forehead with an upward force and further reduce the weight 410 from the headset onto the wearer's nose bridge. Reactive force 430 and reactive force 450 may also provide enough upward force to prevent the headset from slipping/falling down the face of the wearer and to keep the headset securely registered to the wearer's forehead via the forehead pad 150. Since active force 420 and reactive force 430 may reduce the weight 410 on a wearer's nose bridge, active force 440 and reactive force 450 may further reduce the weight 410 on a wearer's nose bridge. In some embodiments, the active and reactive forces may be enough to completely remove any load bearing on a wearer's nose bridge.

In some embodiments, upper compliant arms 120 may not be required because the compliant arms 110 may be designed to generate active force 420 which in turn generate reactive force 430 and reactive force 450 to counter act the weight 410 against forehead pad 150. In other embodiments, there may be four or six upper compliant arms 120 to further distribute the weight 410 across more portions of the wearer's head to provide even more of a distributed force for more comfort for the wearer and more stability of the headset onto the wearer's head.

One of ordinary skill in the art appreciates in other embodiments; the weight of a headset may be concentrated in other areas of the headset and not just towards the front. In such embodiments, compliant arms may also be deployed to selectively distribute the weight of the headset.

Figure 5:
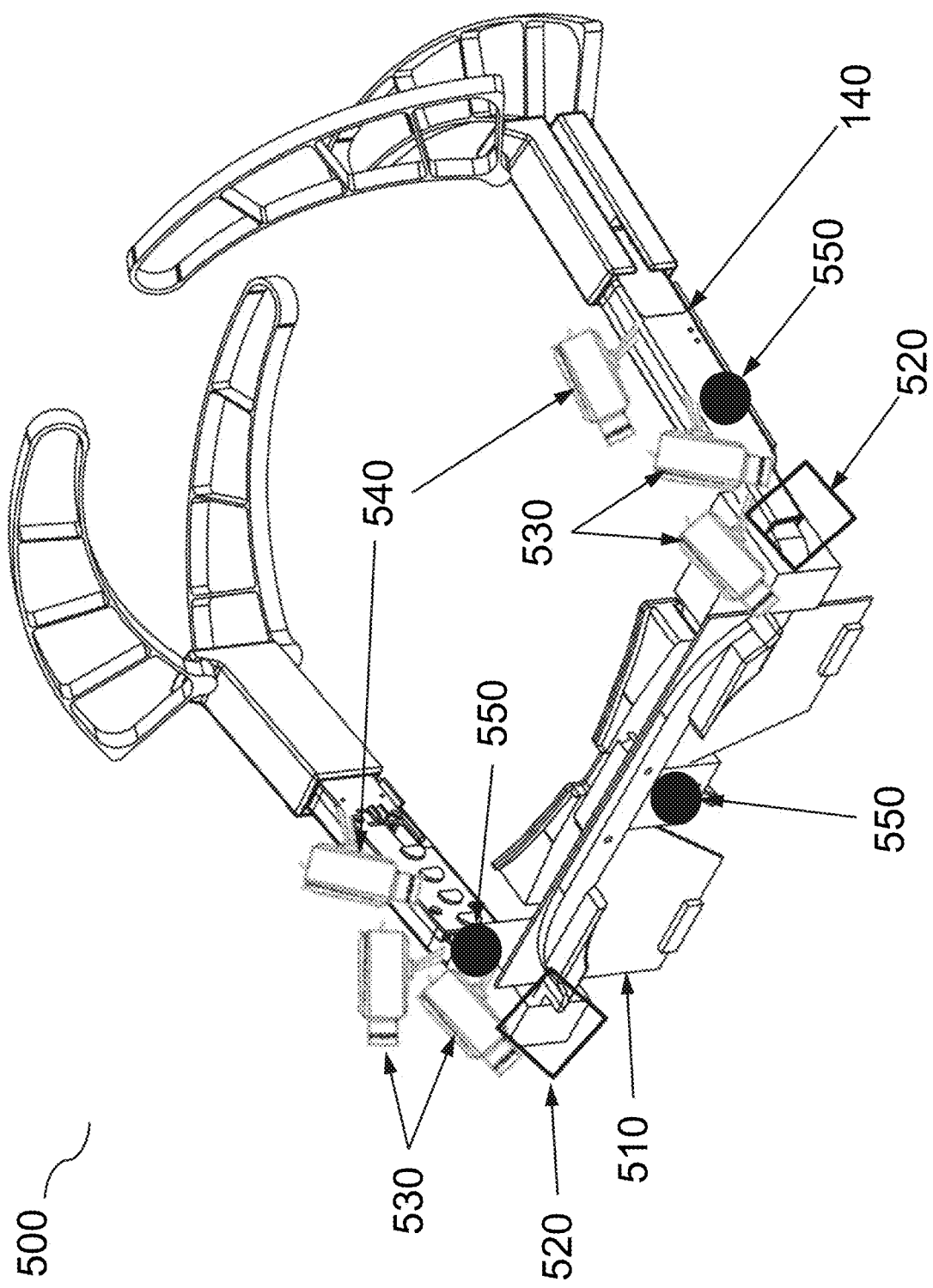
FIG. 5 illustrates an example of a virtual reality/augmented reality headset using a compliant arm according to some embodiments of the invention.

FIG. 5 illustrates an example of a virtual reality/augmented reality headset using a compliant mounting arm according to some embodiments of the invention. Headset 500 includes components that add extra weight to frame 140 from FIG. 1. Lens 510 is the lens a wearer of headset 500 would be looking into or through with the wearer's eyes. In some embodiments, lens 510 may be an LCD screen that may include, for example, additional electronic components within the LCD screen to operate the LCD screen. In some embodiments there may be only one lens 510. In other embodiments there may be two or more lens 510. In other embodiments, lens 510 may be clear as eyeglasses in some portions of the lenses and non-opaque in other portions. In other embodiments, lens 510 may be used as a projection screen for projector 540 to project images/videos onto the lens 510.

In some embodiments, projector 540 may project images and/or videos onto the lens 510 for the wearer to see and interact with the VR/AR system. In some embodiments, there may be one or more projector 540. In some embodiments, projector 540 may not be present depending on the configuration of headset 500.

Camera 530 is used for capturing images or videos of the surrounding environment of the wearer. In some embodiments, Camera 530 is outward facing with respect to the wearer. The images and videos captured by the one or more camera 530 may be fed to electronic component 520 for processing, rendering, and/or sending to an external system (not shown in the figures) to the headset.

Electronic component 520 may be used to process locally on headset 500 certain software programs for example image and video capturing, rendering and processing. Electronic component 520 may also provide the computational power to receive images and videos from an external system and display and project the images and videos onto the lens 510 via the one or more projector 540. Furthermore, electronic component 520 may process input data received from one or more sensor 550.

Sensor 550 may track location of the wearer, the movement of the wearer to determine a pose of the wearer's line of sight, etc. Sensor 550 may also sense the surrounding temperature. Data that is tracked by sensor may be sent to electronic component 520 for processing or for relay to an external system.

In some embodiments there may be one or more electronic components located on the frame 140. In some embodiments there may be one or more sensor 550. One of ordinary skilled in the art appreciates the collection of the multiple components on the frame 140 add additional weight to the frame 140. Furthermore, the majority of the additional weight is generally toward to front portion of frame 140 (e.g., the portion towards the lens 510) and thus, the additional weight, if undistributed would most likely rest upon the nose bridge of a wearer.

Figure 6:
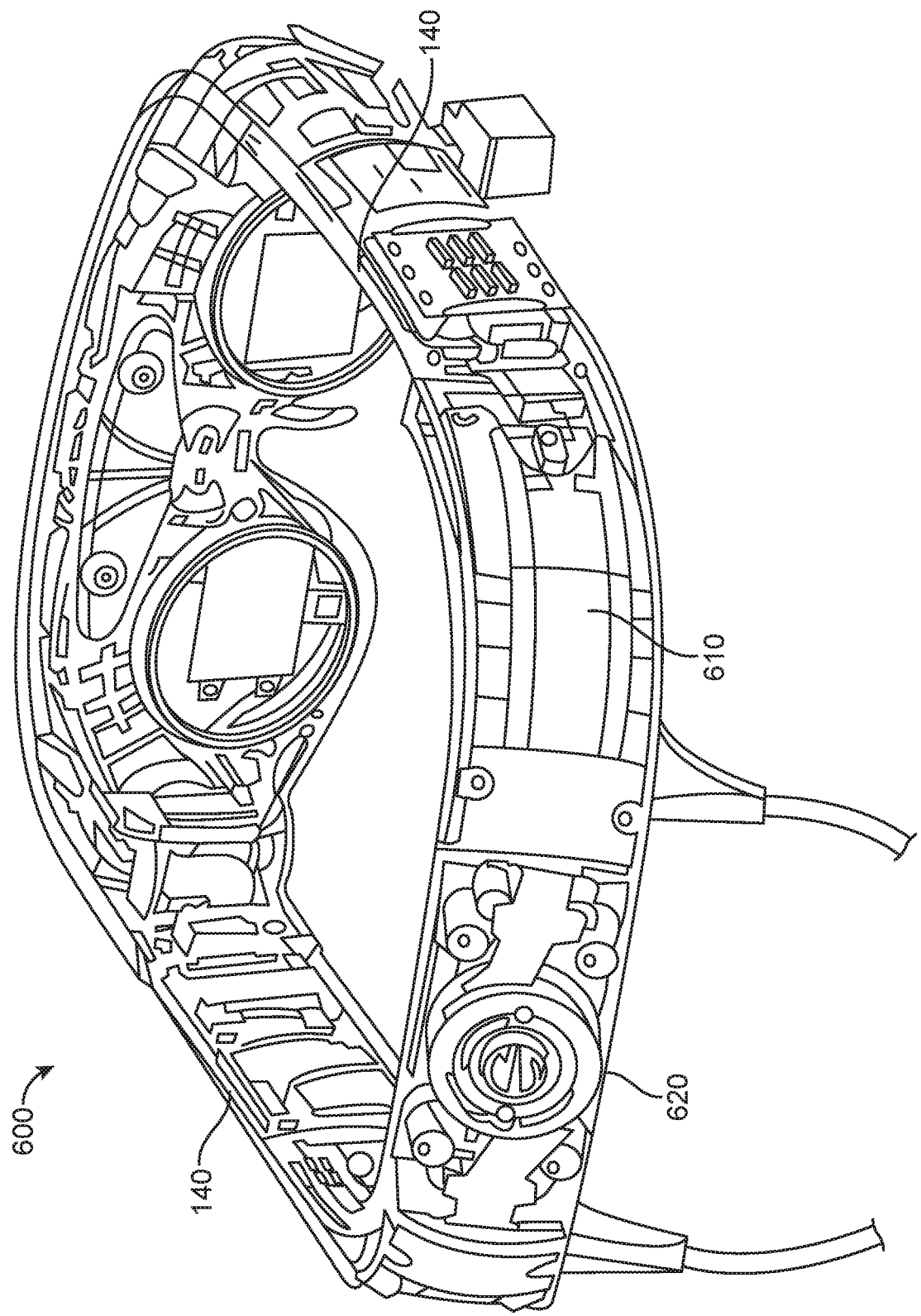
FIG. 6 illustrates an example of a virtual reality/augmented reality headset according to some embodiments of the invention.

FIG. 6 illustrates an example of a virtual reality/augmented reality headset according to some embodiments of the invention. Headset 600 includes AR/VR components similar to FIG. 5 attached to a frame 140. Compliant arms 610 may be attached to frame 140 such that the compliant arms 610 (depicted as being within the frame of the headset) wrap around the whole head of a user. The compliant arms 610 may be joined together by a connector 620. The connector 620 may include a spool type spring that provides a compression force to join the compliant arms, wherein the spool type spring provides a compression force that joins the compliant arms together for fitting adjustments to accommodate different head sizes instead of a compression force for constricting the compliant arms and headset to a user's head.

Connector 620 may maintain a continuous force via the spool type spring so that the user does not have to manually adjust the compliant arms or the connector 620 once the headset 600 is adjusted to fit the user's head. For example, a user may adjust a circumference of the wrap around configuration (e.g., expand) of headset 600 by separating the compliant arms 610 such that the spool type spring of connector 620 may maintain a compression force to hold the compliant arms 610 in a shape that provides an appropriate circumference to maintain a comfortable fit for different sized heads. Headset 600 may rest on the parietal bone located just above the occipital bone of a user to prevent interference with the user's ears while maintaining a counterweight to the front viewing optics assembly. Headset 600 may prevent the frame 140 having the front viewing optics assembly from slipping down the nose bridge by transferring the weight of the headset 600 from a user's nose bridge to other areas of a user's head (e.g., parietal bone/crown, occipital bone, and forehead).

Figure 7:
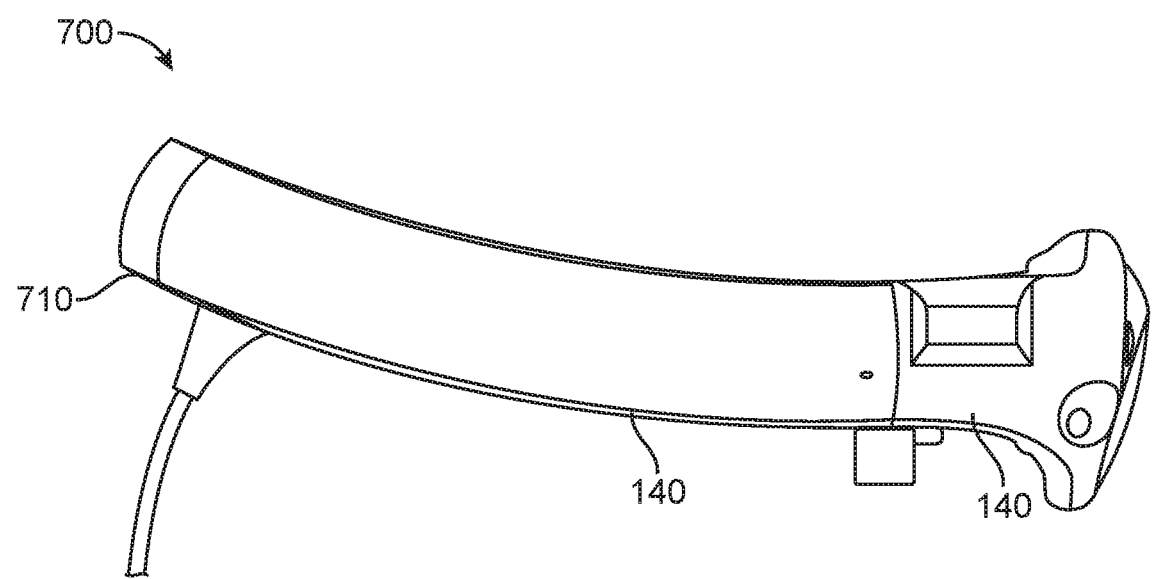
FIG. 7 illustrates a side view of a virtual reality/augmented reality headset according to some embodiments of the invention.

FIG. 7 illustrates a side view of a virtual reality/augmented reality headset according to some embodiments of the invention. Headset 700 may include AR/VR components, compliant arms 610, connector 620 and frame 140 similar to FIG. 6 that further includes a wrap around configuration. Compliant arms 610 may include an upward bend 710 that allows the compliant arms 610 to rest and/or hang on a top portion of the occipital bone and/or the parietal bone of a user's head instead of requiring a constricting force to securely wrap the headset 700 around a user's head.

The upward bend of the compliant arms is in relation to the frame 140 comprising the AR/VR components such that the backside of headset 700 having the joined compliant arms may rest above the occipital bone and/or on the parietal crown. Additionally, the upward bend may be a compound or multi-directional/multi-axial curve or contour about the calvaria region of the head. Such multi-directional/multi-axial curve or contour occurs at least about an axis that generally is vertical though a head, and about a horizontal axis orthogonal to the vertical axis and generally runs between the ears of a user. A multi-directional/multi-axial curve or contour of the compliant arms, in combination with the connector between the two compliant arms having an angle that approximates a slope of the posterior aspect of the parietal bones when viewed in the sagittal plane, allows the headset 700 to maintain contact interface with the head and rest on the top portion of the occipital bone and/or upon the parietal bone/crown of a user's head. The upward bend 710 may improve weight balance of the headset 700 by hanging the headset 700 from the head rather than clamping down on or hugging the head, and minimize interference with a user skeletal structure or hair otherwise. Furthermore, in some embodiments the multi-directional/multi-axial curve or contour culminating at the upward bend 710 at the distal ends may help to prevent headset 700 from sliding down and resting on a user's ears by having a geometry smaller than that of the occipital bone, which would serve as an anatomical obstruction to such sliding motion. Additionally, the upward bend 710 may also allow a more universal fit for different head shapes and/or sizes. Yet even further, the upward bend 710 may allow headset 700 to rest and/or hang from the occipital bun and/or the parietal bone/crown to prevent interference with the user's ears while maintaining a counterweight to the front viewing optics assembly. The upward bend 710 may also prevent the front viewing optics assembly from slipping down the nose bridge by transferring the pressure and force of the weight of the headset 700 from a user's nose bridge to other areas of a user's head (e.g., occipital bun, crown, etc. . . . ).

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A headset, comprising:
   a compliant arm having a rib and a loop structure that comprises one or more openings, wherein
      the rib comprises a straight segment along a longitudinal direction and a thickness that is normal to a plane on which the longitudinal direction is located, and
      the loop structure and the straight segment of the rib form a planar structure that corresponds to the plane; and
   a frame to which the compliant arm is adjustably attached, wherein
      the planar structure comprising the loop structure and the rib corresponds to a deformation profile upon which at least a size or a shape of the loop structure or the rib is determined for accommodating multiple head sizes or head shapes,
      the planar structure of the compliant arm distributes at least a portion of a weight of the headset with at least a deformation of at least the rib or the loop structure based at least in part upon the deformation profile, and
      the plane on which at least a portion of the planar structure is located, when the headset is placed on a head of a user, is normal to a portion of a circumferential contour of the head of the user in contact with the planar structure.

2. The headset of claim 1, wherein the compliant arm distributes a point load due to the at least the portion of the weight of the headset onto the head of the user.

3. The headset of claim 1, wherein the straight segment of the rib in the compliant arm comprises a slenderness ratio, and the compliant art comprises a deformation profile.

4. The headset of claim 1, wherein the loop structure of the compliant arm has an inner wall and an outer wall, and the compliant arm distributes the at least the portion of the headset due to the deformation of at least the rib or at least one of the inner wall or the outer wall of the compliant arm.

5. The headset of claim 1, wherein the compliant arm is adjustably attached to the frame and provides adjustments along multiple axes.

6. The headset of claim 1, wherein the deformation occurs in one or more directions with respect to the plane due to the at least the portion of the weight of the headset.

7. The headset of claim 1, wherein the compliant arm and the frame are constructed as one single body, and wherein the compliant arm is adjustable on multiple axes relative to the frame.

8. The headset of claim 1, further comprising two upper compliant arms, and a separate compliant arm different from the compliant arm, wherein an upper compliant arm of the two upper compliant arms comprises a first loop structure enclosing a first rib and comprising one or more separate openings, wherein
   the first rib comprises a first straight segment along a first longitudinal direction,
   the first loop structure and the first straight segment form a first planar structure that corresponds to a first plane on which the first longitudinal direction is located, and
   when the headset is placed on the head of the user, the first plane on which at least a portion of the first planar structure is located is normal to a portion of a first contour of the head of the user in contact with the first planar structure,
the compliant arm comprises a deformation profile which, when under load, approximately matches a contour of the head of the user, and
the two upper compliant arms, the compliant arm, and the separate compliant arm are each adjustable on multiple axes.

9. The headset of claim 1, wherein the compliant arm is joined to the frame by a connector, the connector comprising a spool type spring.

10. The headset of claim 9, wherein the compliant arm comprises an upward bend.

11. The headset of claim 1, wherein the headset is a virtual reality or augmented reality headset.

12. A compliant arm, comprising:
    an outer wall;
    an inner wall;
    a wall bridge connecting the inner wall and the outer wall; and
    a plurality of ribs connecting at least the outer wall and the inner wall, wherein
       a rib of the plurality of ribs comprises a straight segment along a longitudinal direction and a thickness that is normal to a plane on which the longitudinal direction is located,
       the outer wall, the inner wall, and the wall bridge are arranged to form a loop structure having one or more openings,
       the straight segment of the rib and the loop structure are connected together to form a planar structure,
       the planar structure corresponds to the plane and further corresponds to a deformation profile upon which at least a size or a shape of the loop structure or the rib is determined for accommodating multiple head sizes or head shapes, and
       the outer wall, the inner wall, the wall bridge, and the plurality of ribs selectively distribute, based at least in part upon the deformation profile, a load by a deformation of at least one of the inner wall, the outer wall, or the straight segment of the rib of the plurality of ribs with respect to the plane due to a load along the longitudinal direction of the straight segment.

13. The compliant arm of claim 12, wherein the planar structure is a single body of a same material.

14. The compliant arm of claim 12, wherein the plane on which at least a portion of the planar structure of the compliant arm is located, when placed on a head of a user, is normal to a portion of a contour of the head of the user in contact with the planar structure.

15. The compliant arm of claim 12, wherein the same material comprises a thermoplastic material.

16. The compliant arm of claim 12, wherein the compliant arm is adjustable on one or more axes when coupled to a frame.

17. The compliant arm of claim 12, wherein the compliant arm comprises a plurality of ribs, and the plurality of ribs have multiple spacing values or multiple thicknesses.

18. The compliant arm of claim 12, wherein the deformation occurs under a load in the inner wall or the outer wall of the planar structure of the compliant arm but not within the rib.

19. The compliant arm of claim 18, wherein at least one end of both ends of the rib of the plurality of ribs is attached to the inner wall or the outer wall with a hinge, wherein the longitudinal direction changes orientation relative to the inner wall or the outer wall under the load.

20. The compliant arm of claim 12, wherein the rib of the plurality of ribs corresponds to a slenderness ratio for a deformation profile of the planar structure.

21. The compliant arm of claim 12, wherein the rib of the plurality of ribs comprises a non-uniform cross-sectional area that is determined based at least in part upon loading along the rib.

22. The compliant arm of claim 12, wherein the plurality of ribs further comprises a separate rib which, when under a loading condition, is in a compressive state, while the rib is in a tensile state.

23. The compliant arm of claim 12, wherein the planar structure corresponds to a deformation profile that is to approximately match at least a portion of a contour of at least a part of a user's body when the compliant arm under load is in contact with the at least the part of the user's body.

24. The compliant arm of claim 12, wherein the outer wall and the plurality of ribs are constructed of different materials.

25. The compliant arm of claim 12, wherein the inner wall is in compression, the outer wall is in tension, the wall bridge is in compression and tension, and each of the plurality of ribs is in either tension or compression when a load is applied to the compliant arm.

26. The compliant arm of claim 12, wherein a first rib located on one end of the plurality of ribs is configured to exhibit least flexibility than one or more remaining ribs of the plurality of ribs of the compliant arm.

27. The compliant arm of claim 12, wherein the plurality of ribs defines a corresponding plurality of spaces, wherein each space of the corresponding plurality of spaces is adjacent to at least one rib of the plurality of ribs.

28. A headset comprising:
a first pair of upper compliant arms that, when the headset is placed on a head of a user, extends over a top of the head of the user of the headset;
a second pair of lower compliant arms that, when the headset is placed on the head of the user, extends over a back of the head of the user, wherein
a compliant arm of the first and second pairs comprises a rib and a loop structure that comprises one or more openings,
the rib comprises a straight segment along a longitudinal direction and a thickness that is normal to a plane on which the longitudinal direction is located,
the loop structure and at least the straight segment of the rib are configured to form a planar structure, and
the planar structure corresponds to the plane and further corresponds to a deformation profile upon which at least a size or a shape of the loop structure or the rib is determined for accommodating multiple head sizes or head shapes; and
a frame coupled to the first and second pairs, wherein the first and the second pairs, when
the headset is placed on the head of the user, distribute, based at least in part upon the deformation profile, a weight of the headset with at least a deformation of at least the rib of the compliant arm, and
the plane on which at least a portion of the planar structure is located, when the headset is placed on the head of the user, is normal to a portion of a circumferential contour of the head of the user in contact with the planar structure.

29. The headset of claim 28, wherein the compliant arm comprises and inner wall and an outer wall, wherein the first and the second pairs distribute the weight of the headset with the deformation of at least one of the inner wall or the outer wall of the compliant arm.

30. The headset of claim 28, wherein at least each compliant arm in the first and the second pairs comprises a respective rib, and the first and the second pairs distribute the weight of the headset via with the deformation of the respective rib of the each compliant arm in the first and the second pairs.

31. The headset of claim 28, wherein each compliant arm in the first and the second pairs is adjustable on a plurality of axes.

\* \* \* \* \*